A. A. SCHRODER.
Ventilating Damper.
No. 163,109.  Patented May 11, 1875.
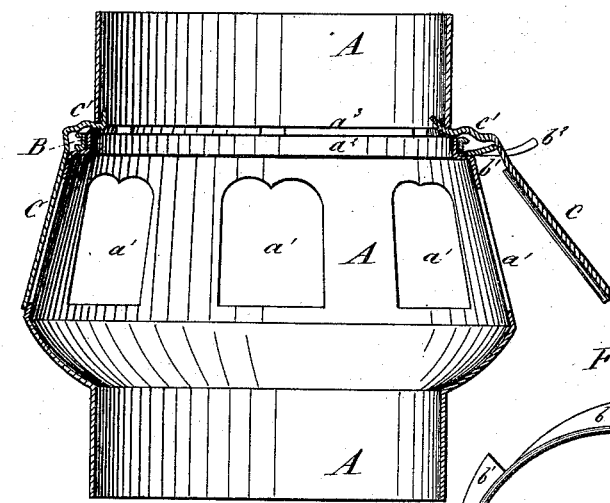
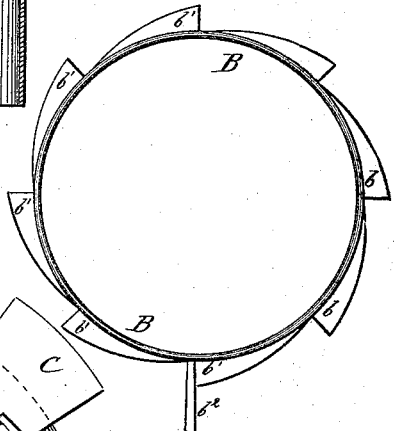
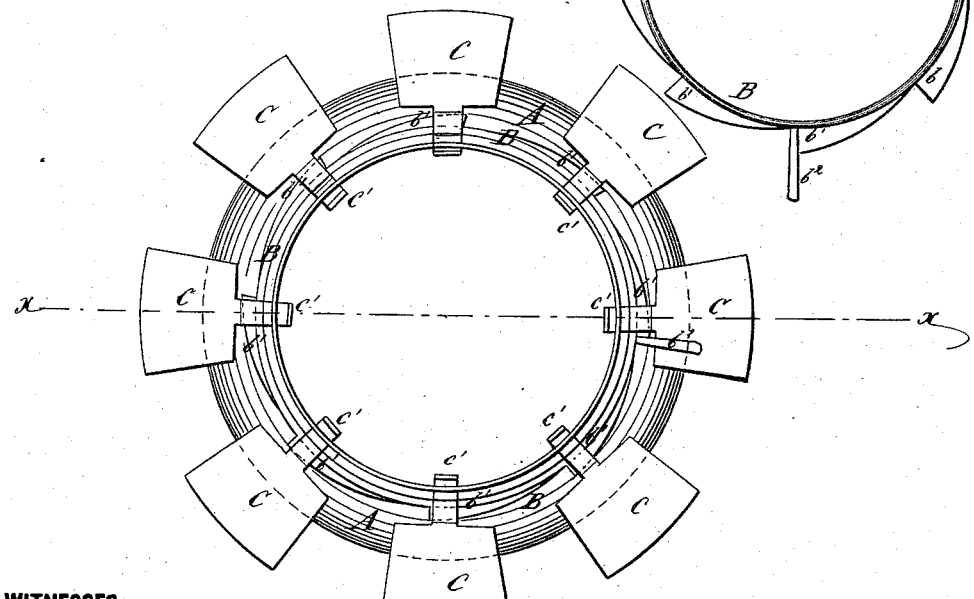
WITNESSES:  
C. Neveux  
A. F. Terry
INVENTOR:  
Anson A. Schroder  
BY  
Munn & Co.  
ATTORNEYS.

UNITED STATES PATENT OFFICE.

ANSON AUGUSTUS SCHRODER, OF WARREN, ILLINOIS.

IMPROVEMENT IN VENTILATING-DAMPERS.

Specification forming part of Letters Patent No. 163,109, dated May 11, 1875; application filed April 17, 1875.

*To all whom it may concern:*

Be it known that I, ANSON A. SCHRODER, of Warren, in the county of Jo Daviess and State of Illinois, have invented a new and useful Improvement in Ventilating-Damper, of which the following is a specification:

Figure 1 is a vertical section of my improved device, taken through the line $x\ x$, Fig. 2. Fig. 2 is a top view of the same. Fig. 3 is a detail top view of the cam-ring.

Similar letters of reference indicate corresponding parts.

The object of this invention is to furnish an improved device for attachment to a ventilator-pipe, or to a stove-pipe, to enable the passage of air into said pipe to be regulated as desired, and which shall be simple in construction, convenient in use, and effective in operation.

The invention consists in the pipe made with a conical enlargement in its middle part, having openings formed in it, with two shoulders at the upper end of said enlargement, and with holes above said enlargement, the ring having inclined flanges or cams, and a handle formed upon it, and the dampers, having stems formed upon their upper edges in combination with each other, as hereinafter fully described.

A is a portion or section of pipe of any desired size, and which is made with a conical enlargement in its middle part. In the conical enlargement of the pipe A is formed a number of holes or openings, $a'$, occupying about two-thirds or three-fourths the area of said enlargement. At the upper end of the conical enlargement of the pipe A are formed two shoulders or offsets, $a^2\ a^3$, the lower one of which is designed to form a seat for the ring B, and the other or upper one of which is designed to serve as a fulcrum, pivot, or hinge for the dampers C. The dampers C are made of such a shape and size as to cover the openings $a^1$, and fit snugly upon the surface of the conical enlargement of the pipe A. Upon the upper edge of the dampers C are formed stems $c'$, which are passed through holes in the pipe A just above the upper shoulder $a^3$. The stems $c'$ are made with bends or curves corresponding somewhat with the shoulders $a^2\ a^3$, so that the dampers C may fit snugly upon the inclined face of the conical enlargement of the pipe A, and their upper ends are curved upward somewhat to prevent them from dropping out of the holes in which they are placed. Upon the ring B are formed as many inclined flanges or cams $b^1$ as there are dampers C, and also a stem or handle, $b^2$, for convenience in operating it.

By this construction, by moving the ring B in one direction, the flanges or cams $b^1$ will pass in beneath the stems $c'$ of the dampers C, and raise said dampers, as shown in Figs. 1 and 2, and by moving the said ring in the opposite direction the dampers C will be allowed to drop into their seats, where they will be kept in place by their own weight.

The device A B C may be made of sheet or cast metal, as may be desired.

Having thus described my invention, I claim as new and desire to secure by Letters Patent—

The pipe A, made with a conical enlargement in its middle part, having openings $a^1$ formed in it, with two shoulders, $a^2\ a^3$, at the upper end of said enlargement, and with holes above said shoulders, the ring B, having inclined flanges or cams $b^1$, and a handle, $b^2$, formed upon it, and the dampers C, having stems $c'$ formed upon their upper edges, in combination with each other, substantially as herein shown and described.

ANSON AUGUSTUS SCHRODER.

Witnesses:
 CALVIN A. KREAMER,
 JAMES L. COOLEY.